United States Patent [19]

Streit et al.

[11] 4,224,421
[45] Sep. 23, 1980

[54] WATER-SOLUBLE, CROSSLINKED NITROGEN-CONTAINING CONDENSATION PRODUCTS

[75] Inventors: Werner Streit, Bobenheim; Rolf Fikentscher; Karl Gans, both of Ludwigshafen; Gerhard Welzel, Mannheim; Klaus Glaser, Mutterstadt; Emil Schaefer, Ludwigshafen, all of Fed. Rep. of Germany

[73] Assignee: BASF Aktiengesellschaft, Fed. Rep. of Germany

[21] Appl. No.: 921,221

[22] Filed: Jul. 3, 1978

[30] Foreign Application Priority Data

Jul. 28, 1977 [DE] Fed. Rep. of Germany ....... 2733973

[51] Int. Cl.$^2$ .................... C08G 65/22; C08G 65/26
[52] U.S. Cl. ................ 525/403; 260/29.2 N; 528/405; 528/407; 528/424; 525/403; 525/523
[58] Field of Search .............. 260/823, 29.2 N; 528/404, 405, 407, 424; 525/403

[56] References Cited

U.S. PATENT DOCUMENTS

| | | | |
|---|---|---|---|
| 3,347,803 | 10/1967 | Frotscher et al. | 528/405 |
| 3,567,659 | 3/1971 | Nagy | 528/405 |
| 3,577,313 | 5/1971 | Bolger et al. | 528/405 |
| 3,746,678 | 7/1973 | Dick et al. | 528/404 |
| 3,753,931 | 8/1973 | Raspanti | 528/404 |
| 3,819,541 | 6/1974 | Longoria et al. | 528/405 |
| 3,915,904 | 10/1975 | Tonkyn et al. | 528/405 |
| 4,128,511 | 12/1978 | Streit et al. | 528/404 |

Primary Examiner—Allan Lieberman
Attorney, Agent, or Firm—Keil & Witherspoon

[57] ABSTRACT

Water-soluble, crosslinked nitrogen-containing condensation products, the viscosity of which, in aqueous solution, increases with increasing temperature, are obtained by reacting a block copolymer of the formula:

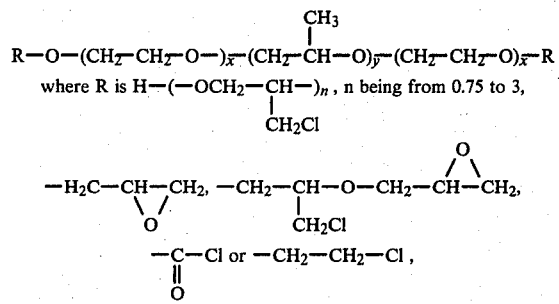

x is from 50 to 250, y is from 20 to 100, the ratio of x to y is from 6.5:1 to 1:15, with compounds having at least four basic NH groups in a weight ratio of from 0.8:1 to 30:1. The products are added to aqueous systems, e.g. polymer solutions and polymer dispersions, to improve the viscosity characteristics.

4 Claims, No Drawings

WATER-SOLUBLE, CROSSLINKED NITROGEN-CONTAINING CONDENSATION PRODUCTS

The present invention relates to water-soluble, crosslinked nitrogen-containing condensation products, the viscosity of which, in aqueous solution, increases with increasing temperature and again decreases on lowering the temperature.

U.S. Pat. No. 3,347,803 discloses incompletely condensed alkali-curable resins which are prepared by reacting polyether-chlorohydrins, where the polyether chain contains from 3 to 70 alkylene oxide units, with polyamines or ammonia in certain specific molar ratios. The products are used as curable coatings for metal and glass, and as textile finishes. The viscosity of an aqueous solution of the condensation products decreases with increasing temperature.

It is an object of the present invention to provide a water-soluble resin, the viscosity of which, in aqueous solution, increases with increasing temperature and again decreases on lowering the temperature.

This object is achieved by providing water-soluble, crosslinked nitrogen-containing condensation products, the viscosity of which, in aqueous solution, increases with increasing temperature and again decreases on lowering the temperature, which products are obtained by reacting a block copolymer of the formula $$R-O-(CH_2-CH_2-O-)_x-(CH_2-CH(CH_3)-O)_y-(CH_2-CH_2-O)_x-R$$

where $R = H-(-OCH_2-CH(CH_2Cl)-)_n$, n being from 0.75 to 3,

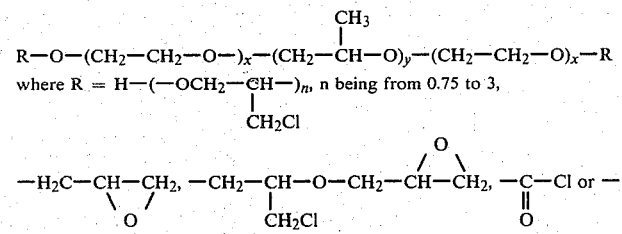

x is from 50 to 250, y is from 20 to 100 and the ratio x:y is from 6.5:1 to 1:15, with a compound which contains at least four basic NH groups, in a weight ratio of from 0.8:1 to 30:1, in a polar solvent at from 20° to 180° C.

The compounds of the formula I are obtained by introducing reactive groups into block copolymers of the formula

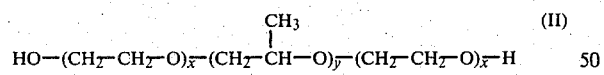
(II)

where x is from 50 to 250, y is from 20 to 100 and the ratio x:y is from 6.5:1 to 1:15.

The compounds of the formula II are obtained, for example, by adduct formation between ethylene oxide and a polypropylene glycol which contains from 20 to 120 propylene oxide units. For the reaction, the molar ratio of ethylene oxide units to propylene oxide units in the block copolymer is selected to be from 6.5:1 to 1:15, whilst the degree of ethoxylation per hydroxyl group in the polypropylene glycol is from 50 to 250, preferably from 75 to 150. To introduce reactive groups into this block copolymer, the latter may for example be reacted with epichlorohydrin in the molar ratio of from 1:1.5 to 1:6. This reaction is carried out undiluted or in a solvent, using a Lewis acid. The Lewis acid used is in particular selected from boron trifluoride etherates, complexes of boron trifluoride with acetic acid, phosphoric acid and AlCl₃, ZnCl₂, FeCl₃, SnCl₄, H₂SO₄ and HClO₄. On reacting a compound of the formula II with epichlorohydrin, a compound of the formula I, where the substituent R is

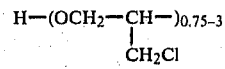

If these products are treated with a base, eg. potassium hydroxide or sodium hydroxide, the corresponding diepoxides are obtained. In this case, the substituent R in the formula I is

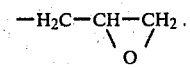

However, if the reactive radical R in formula I represents 2 or 3 epichlorohydrin units, the reaction of these compounds with a base gives products of the formula I, where the substituent R is

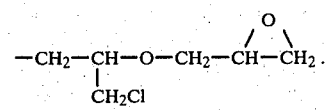

Furthermore, reactive groups can be introduced into (I)

a compound of the formula II by reacting it with phosgene. In that case, the substituent R in the formula I is

The reaction of a compound of the formula II with phosphorus trichloride gives the corresponding dichlorides, where the substituent R of the formula I is Cl.

The reaction of a compound of the formula II with a compound from the above categories may be carried out over a wide temperature range, eg. at from 10° to 120° C. As a rule it is advantageous to use a polar solvent but the reaction can also be carried out in the absence of a solvent.

To prepare the water-soluble crosslinked nitrogen-containing condensation product of the invention, the compound of the formula I is reacted with a polyamine or with a compound which contains at least four basic NH groups. Amongst poilyamines, it is again only those which contain at least four basic NH groups in the molecule which are suitable. These compounds may, for example, be defined by the formula

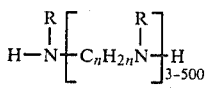

where R is H, alkyl of 1 to 4 carbon atoms, alkylsulfonate of 1 to 6 carbon atoms or —CH$_2$—COOH, and n is 2-4.

Further suitable compounds which contain four basic NH groups are condensation products of ammonia or an amine with ethylene chloride, epichlorohydrin or a short-chain dichlorohydrin ether, eg. the condensation products of ammonia and the dichlorohydrin ether of ethylene glycol, of ethylenediamine and ethylene chloride or of ethylenediamine and epichlorohydrin, and reaction products of a short-chain diepoxide, eg. 1,4-butanediol bis-glycidyl ether or ethylene glycol bis-glycidyl ether with diethylenetriamine or methylamine, and condensation products of urea and a diamine or polyamine, eg. ethylenediamine, diethylenetriamine and tris-3-aminopropylamine. Short-chain bis-glycidylamines may also be used as diepoxides. The amines to be used contain at least one NH group. Suitable amines include monoamines and polyamines containing at least one NH group, eg. methylamine, ethylamine, dimethylamine, ethylenediamine, diethylenetriamine and polyethyleneimine. The viscosity of the condensation products of ammonia and of the suitable amines is at most 2,500 mPas (measured in 50% strength aqueous solution at 20° C.) and is in general from 30 to 1,700 mPas.

Further suitable compounds which contain at least four basic NH groups are condensation products of a polyamine with a dicarboxylic acid of 4 to 10 carbon atoms, eg. succinic acid, maleic acid, adipic acid, glutaric acid, sebacic acid and terephthalic acid. The suitable polyamines have from 2 to 6 alkylene bridges between the primary amine groups. Preferably, a polyamine with from 3 to 10 basic nitrogen atoms per molecule is used for the condensation with one of the above dicarboxylic acids. Examples of the polyamines are diethylenetriamine, triethylenetetramine, tetraethylenetetramine, dipropylenetriamine, tripropylenetetramine and dihexamethylenetriamine. The viscosity of the condensation products of amines and dicarboxylic acids is from 40 to 1,800 mPas and should not exceed 2,500 mPas (measured in 50% strength aqueous solution at 20° C.).

To prepare the products of the invention, the polyether of the formula I, containing reactive end groups, is reacted with the compound containing at least 4 basic NH groups in the weight ratio of from 0.8:1 to 30:1. This gives crosslinked nitrogen-containing condensation products which are water-soluble, and the viscosity of which, in aqueous solution, increases with increasing temperature and decreases on cooling. Accordingly, the viscosity changes in aqueous solution are reversible. The condensation of the two components is carried out so as to give water-soluble products. The reaction may be carried out in the absence or presence of a polar solvent. However, it is also possible to introduce the polyamine into a reaction vessel and add the other component until the viscosity of the reaction mixture rises.

The reaction mixture is then diluted with a solvent and further quantities of compound of the formula I are added. Examples of suitable solvents are water, alcohols, eg. methanol, ethanol, propanols, ethylene glycol and propylene glycol, as well as monoalkyl ethers derived from the polyhydric alcohols, eg. monomethyl glycol ether, and diglycol ethers and triglycol ethers. Further suitable solvents are dioxane, tetrahydrofuran and mixtures of polar solvents with water, eg. a mixture of water and tetrahydrofuran in the ratio of 1:1.

The water-soluble, crosslinked nitrogen-containing condensation products can also be obtained by reacting a solution of the compound of the formula I with the compound containing NH groups. The component employed in excess is as a rule initially introduced into the reaction vessel. The condensation reaction may be carried out batchwise or continuously. Particularly uniform products are obtained by first condensing from about 5 to 15% of the compounds in question in a reaction vessel and then introducing the remaining starting materials batchwise or continuously, the rate of addition of the starting materials being matched to the rate of reaction. If the viscosity should rise excessively as the reaction progresses, it is advisable to lower the solids concentration in the reaction mixture by adding solvent, so as to ensure good mixing of the reactants. The reaction temperature can vary within a wide range and is in general from room temperature to 160° C. If water is used as the sole solvent, the reaction is preferably carried out at from 40° to 80° C.

The condensation products of the invention can be prepared by the reverse suspension polymerization process. In this, an aqueous solution of a compound of the formula I and of the compound containing at least 4 NH groups is dispersed in a water-immiscible solvent, eg. an aliphatic or aromatic hydrocarbon or chlorohydrocarbon. Dispersions of the water-soluble, crosslinked nitrogen-containing condensation products of the invention are obtained by this method.

The products prepared according to the invention may be used for a range of applications. For example, in pigment coloring or finishing of fabrics, they prevent colorant migration and the formation of deposits on the rollers. For this purpose, the compounds according to the invention are employed in an amount of from 0.05 to 7%, based on the print paste. In the electroplating industry, the addition of from 0.01 to 20% to electrolytic pre-treatment baths increases the gloss on electrolytic deposition of a metal. The products may also be used to improve the viscosity characteristics of aqueous systems, eg. polymer solutions and polymer dispersions. For example, the addition of from 1 to 20% of a product according to the invention to a polymer solution or dispersion has the effect that the viscosity of the solution or dispersion does not decrease on heating.

The Examples which follow illustrate the invention. Parts are by weight, and percentages relate to the weight of the materials.

EXAMPLE 1

480 parts of a 33% strength aqueous solution of a crosslinking agent of the formula

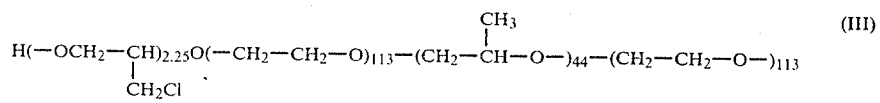

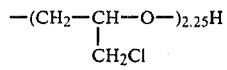

$(x : y = 2.56 : 1)$ are added, at room temperature, to 100 parts of a 25% strength aqueous solution of a polyamine of the formula

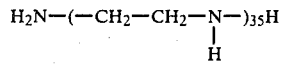

and the mixture is then diluted with 280 parts of water, heated to 60°–70° C. and kept at this temperature for 4 hours. During the condensation reaction, the viscosity of the aqueous solution increases greatly. Hence, a further 733 parts of water are added during the condensation so that a 10% strength aqueous solution of a cross-linked, nitrogen-containing condensation product are obtained. A 2.5% strength aqueous solution of the condensation product has a viscosity of 5 mPas at 20° C., 150 mPas at 50° C. and 380 mPas at 80° C.

The condensation product may be used as an assistant for pigment coloring and finishing of fabrics. If, for example, 1% of the condensation products of the invention is added to the colorant bath, the formation of a deposit on the rollers during application of the print paste to the fabric is prevented, as is colorant migration during coloring of the fabric.

In electroplating, the addition of from 0.01 to 20% of the product to a pre-treatment bath results in increased gloss during metal electrodeposition.

EXAMPLE 2

400 parts of a 50% strength aqueous solution of a dichlorohydrin ether of the general formula

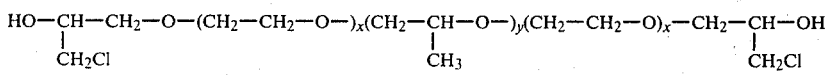

where x is 75, y is 30 and the ratio x:y is 2.5:1, are treated with 4.6 parts of concentrated NaOH at 35° C. After a reaction time of three hours, the epoxide value of the reaction product (diepoxide) is 0.19 milliequivalent/g.

520 parts of the diepoxide solution are added to 200 parts of a 20% strength aqueous solution of the polyamine described in Example 1 and the mixture is allowed to react at 55°. During the reaction, 1,040 parts of water are added in three portions. The viscosity of the 17% strength resin solution is:

|       | 20° | 80°    |
|-------|-----|--------|
| mPas  | 280 | 36,000 |

The solution is stirred and heated to 55° C. During the reaction the viscosity of the aqueous solution rises greatly. To ensure good mixing of the components it is necessary to add water. In total, 1,040 parts of water are added to three portions. A 17% strength aqueous solution of the nitrogen-containing condensation product has a viscosity of 280 mPas at 20° C. and a viscosity of 36,000 mPas at 80° C.

The reaction product is used as an anti-migration agent in pigment print pastes.

EXAMPLE 3

400 parts of a 50% strength solution of the crosslinking agent of the formula III, described in Example 1, are reacted with 3 parts of 48% strength sodium hydroxide solution at 30° C. in the course of 4 hours to give a diepoxide of the formula

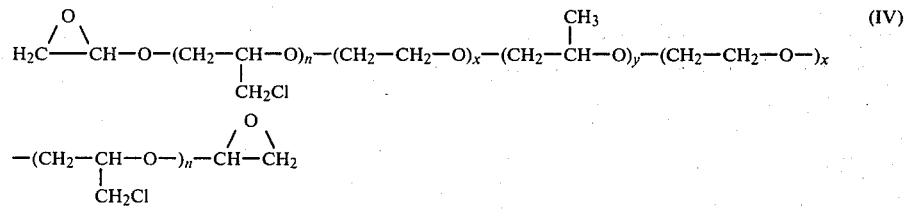

where x is 113, y is 44 and n is 1.25. The epoxide value of the 40% strength aqueous solution is 0.055 milliequivalent/g.

50 parts of a 20% strength aqueous solution of the polyamine described in Example 1 are added to 300 parts of a 33% strength aqueous solution of the diepoxide. The two reactants are heated at 50° C. The reaction is complete after 4 hours. 200 parts of water are added and a 20% strength aqueous solution of a nitrogen-containing, crosslinked condensation product are obtained.

A 5% strength aqueous solution has the following viscosity:

|       | 20° | 50° | 80°   |
|-------|-----|-----|-------|
| mPas  | 17  | 590 | 2,700 |

If a glass fiber web is impregnated with a colorant dispersion which contains 0.4% of the crosslinked, nitrogen-containing condensation product, the colorant is absorbed uniformly. After drying, the web is found to be evenly colored. The binder and colorant are uniformly distributed in the web.

EXAMPLE 4

300 parts of a block copolymer of the formula

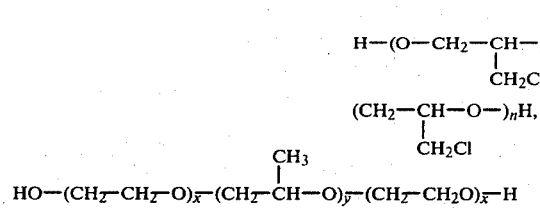
(V)

where x is 113, y is 44, and x:y is 2.56:1, are dissolved in 300 parts of dioxane and the solution is heated to 40° C. Phosgene is then passed into the solution for 4 hours. Thereafter, the excess phosgene is driven off with nitrogen and the dioxane is distilled off under reduced pressure. 50 parts of a 20% aqueous solution of the polyamine described in Example 1 are added to 300 parts of a 33% strength aqueous solution of the chlorocarbonic acid diester obtained above. The mixture is then heated at 70° C., and the reaction is complete after 4 hours. 200 parts of water are added and a 20% strength solution of a crosslinked, nitrogen-containing condensation product are obtained. A 10% strength aqueous solution has the following viscosity:

|      | 20° | 50° | 80° |
| ---- | --- | --- | --- |
| mPas | 12  | 500 | 560 |

The product is used as an additive to paints for painting over paper, in an amount of from 2 to 10% by weight, based on the paint.

EXAMPLE 5

400 parts of the block copolymer of the formula V (compare Example 4) are dissolved in 300 parts of dioxane containing three parts of pyridine. 6 parts of phosphorus trichloride are then added and the reaction mixture is hydrolyzed, after 4 hours, by adding water and 3 parts of 48% strength sodium hydroxide solution. 80 parts of the resulting dihalogen compound are dissolved in 237 parts of water at 80° C. and reacted at this temperature with 50 parts of a 20% strength aqueous solution of the polyamine described in Example 1. After a reaction time of 140 minutes, 3 parts of concentrated sodium hydroxide solution are added and the reaction mixture is heated for 3 hours at 85° C. 15 parts of formic acid are then added and the mixture is diluted to a solids content of 20% with 145 parts of water. A 20% strength aqueous solution of the crosslinked, nitrogen-containing condensation product has the following viscosity:

|      | 20° | 50° | 80° |
| ---- | --- | --- | --- |
| mPas | 30  | 50  | 150 |

EXAMPLE 6

30 parts of a 50% strength solution of bis-(3-aminopropyl)-ethylenediamine are dissolved in 500 parts of a 50% strength aqueous solution of a chlorohydrin ether of the general formula

(VI)

where x is 75, y is 30, n is 2.25 and x:y is 2.5:1. The compounds react at pH 9–10 and 80°. After five hours, a further 220 parts of the chlorohydrin ether are added and the reaction mixture is then diluted with 940 parts of water to a 20% content of condensation product. The 20% strength aqueous solution has the following viscosity:

|      | 20° | 50°   | 80°    |
| ---- | --- | ----- | ------ |
| mPas | 145 | 3,200 | 25,300 |

EXAMPLE 7

230 parts of an amine mixture of 20 parts of ethylenediamine, 45 parts of 3-aminopropyl-ethylenediamine and 35 parts of bis-(3-aminopropyl)-ethylenediamine are dissolved in 384 parts of water and crosslinked at 95° C. with 382 parts of a chlorohydrin ether of the formula

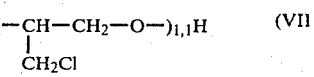
(VII)

in the course of 6 hours. During the reaction, the pH is kept at 10 by adding 117 parts of 48% strength sodium hydroxide solution. The viscosity of a 50% strength resin solution is 320 mPas (20° C.). The active ingredient content is brought to 20% by dilution with water. 50 parts of this 20% strength resin solution are reacted in the course of 8 hours at 75° C. with 246 parts of a 50% strength aqueous solution of the crosslinking agent of the formula III (compare Example 1), by adding this crosslinking agent continuously over the reaction time. In addition, the reaction mixture is diluted with 1,030 parts of water added in four portions during the condensation. A 10% strength aqueous solution has the following viscosity:

|      | 20° | 50°    | 80°      |
| ---- | --- | ------ | -------- |
| mPas | 60  | 14,500 | >100,000 |

If a flax web is impregnated with a conventional binder and a conventional colorant dispersion containing 0.3% of the above water-soluble, nitrogen-containing condensation product, and is squeezed off and dried, the resulting material is evenly colored and uniformly bonded.

EXAMPLE 8

1,287 parts of the amine mixture described in Example 7 are diluted with 300 parts of water and reacted with 533 parts of epichlorohydrin whilst stirring and cooling with ice. The reaction temperature is kept at 90° C.

After 5 hours, 1,547 parts of water are added.

50 parts of a 20% strength aqueous solution of this resin are reacted, at pH 9–10, with 344 parts of the 50% strength crosslinking agent solution described in Example 1. The pH is kept constant by adding 6 parts of concentrated sodium hydroxide solution. Since the viscosity of the mixture rises steadily, 1,420 parts of water are added continuously during the reaction. The reaction temperature is from 60° to 85° C. A 10% strength aqueous solution of a crosslinked, nitrogen-containing condensation product is obtained. This solution has the following viscosity:

|      | 20° | 50° | 80° |
|------|-----|-----|-----|
| mPas | 10  | 450 | 680 |

EXAMPLE 9

438 parts of adipic acid are added to 340 parts of diethylenetriamine at 120° C., with thorough mixing. The reaction mixture is then raised to 160°–180° C. and water is distilled from the reaction mixture until the acid number of the reaction product is less than 10. The mixture is then cooled and diluted to a solids content of 50% by adding 676 parts of water.

A solution comprising 626 parts of water, 4 parts of concentrated sodium hydroxide solution and 270 parts of a dichlorohydrin ether as described in Example 1 is added, at room temperature, to 60 parts of the 50% strength solution of the polyamidoamine described above. After a reaction time of 4 hours at 60°–70° C., the reaction mixture is diluted by adding 530 parts of water and brought to a pH of 5 by adding 10 part of formic acid. A 10% strength aqueous solution has the following viscosity:

|      | 20° | 50°    | 80°    |
|------|-----|--------|--------|
| mPas | 25  | 37,000 | 75,000 |

EXAMPLE 10

690 parts of the dichlorohydrin ether of the formula

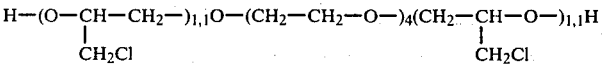

are dissolved in 296 parts of isopropanol and reacted with 118 parts of ammonia at 120° C. under a pressure of from 20 to 40 bars. After 6 hours, the reaction mixture is cooled and the pressure is released. The excess ammonia is removed under reduced pressure. 7 parts of the resulting polyether-amine are reacted, at 70°–85° C., with a solution of 100 parts of the dichlorohydrin ether of Example 1, 200 parts of water and 5 parts of concentrated sodium hydroxide solution. The crosslinking reaction is complete in 4 hours at 70°–85° C. The reaction mixture is then diluted with 213 parts of water and brought to pH 4 with 10 parts of formic acid.

The 20% strength solution has the following viscosity:

|      | 20° | 50°    | 80°      |
|------|-----|--------|----------|
| mPas | 210 | 18,350 | >105,000 |

The condensation product can be used as a lubricant for metal cutting.

EXAMPLE 11

300 parts of a 20% strength solution of a polyethyleneimine having a mean molecular weight of 21,000 are crosslinked at 65°–80° C. with 270 parts of a 22% strength aqueous solution of the dichlorohydrin ether described in Example 6, in the course of 7 hours. During the reaction time, 597 parts of water are added. After cooling, the pH of the reaction mixture is brought to 8 by adding 27 parts of formic acid. A 10% strength aqueous solution has the following viscosity:

|      | 20°   | 50°   | 80°   |
|------|-------|-------|-------|
| mPas | 1,200 | 1,630 | 1,710 |

EXAMPLE 12

126 parts of dimethyl sulfate are added at 50° C., whilst cooling, to 370 parts of a 46.5% strength solution of a polyethyleneimine as described in Example 1. The mixture is allowed to react for two hours at 50° C. and then for two hours at 80° C. 586 parts of a 50% strength aqueous solution of the dichlorohydrin ether of the general formula

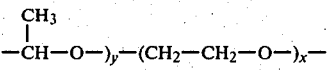

where x is 75, y is 30, n is 1.5 and the ratio x:y is 2.5:1, and 38 parts of concentrated sodium hydroxide solution, are added, at 70°–85° C., to 400 parts of a 20% strength aqueous solution of the methylated polyimine obtained above. During the reaction time of four hours, the mixture is diluted continuously with 634 parts of water, to give a final concentration of 20%. A 10% strength solution has the following viscosity:

| | 20° | 50° | 80° |
|---|---|---|---|
| mPas | 39 | 800 | 5,000 |

The condensation product is used in quenching baths.

EXAMPLE 13

127 parts of a polyethyleneimine of mean molecular weight 800, in the form of a 50% strength solution, are introduced into a reaction vessel and 520 parts of a 25% strength aqueous solution of sodium vinylsulfonate are added slowly at 25° C. After a reaction time of 5 hours at 80° C. the entire vinylsulfonate has reacted with the polyethyleneimine. The proportion of tertiary amine has increased by 30% of the total amine content.

90 parts of a 30% strength aqueous solution of the above reaction product are crosslinked with 495 parts of a 33% strength aqueous solution of the dichlorohydrin ether described in Example 1, in the course of 4 hours at 80° C. During the crosslinking reaction, 280 parts of water containing 5 parts of sodium hydroxide solution are added continuously. The mixture is then cooled, and on adding 934 parts of water a 10% strength aqueous solution of a crosslinked, nitrogen-containing condensation product is obtained. A 5% strength aqueous solution of this condensation product has the following viscosity:

| | 20° | 50° | 80° |
|---|---|---|---|
| mPas | 20 | 600 | 2,010 |

If from 0.001 to 5% of the nitrogen-containing, crosslinked condensation product are added to an electroplating bath, the treated metal shows improved gloss.

EXAMPLE 14

212 parts of a polyethyleneimine having a mean molecular weight of 800 are introduced, in the form of a 50% strength aqueous solution, into a reaction vessel equipped with a stirrer. 145 parts of sodium chloroacetate are added in portions at 60° C., whilst cooling. After about four hours, the reaction has ended. The amount of free chloride ions corresponding to the sodium chloroacetate (2.2 milliequivalents/g) is present. 495 parts of a 33% strength aqueous solution of the dichlorohydrin ether described in Example 1 are added to 20.1 parts of the polyethyleneimine substituted by carboxymethyl groups, in the form of a 50% strength aqueous solution. To dilute the mixture to 20%, 330 parts of water are added during the reaction at 80° C. After 4.5 hours, the mixture is cooled and a 10% strength solution is prepared by further addition of water.

The 10% strength solution has the following viscosity:

| | 20° | 50° | 80° |
|---|---|---|---|
| mPas | 115 | >105,000 | >105,000 |

At 5% strength, the solution can be used as a thickener for paints for use on paper.

EXAMPLE 15

14.4 parts of a 20% strength aqueous solution of a polyethyleneimine having a mean molecular weight of 800 and 38.4 parts of a 25% strength solution of the crosslinking agent described in Example 6 are heated to 60° C. The mixture is diluted with 36.3 parts of water in the course of 2.5 hours. A 14% strength aqueous solution of a condensation product is obtained. 0.4 parts of concentrated sodium hydroxide solution is added to 20 parts of this polyether-amine solution at 60°–70° C. The solution is then allowed to react for 5 hours with 6.6 parts of an 18% strength aqueous solution of a chlorohydrin-ether of the general formula

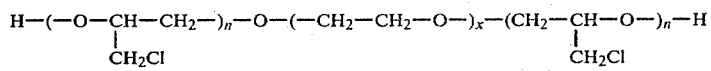

where n is 1.3 and x is 34. During the reaction, the mixture is continuously diluted with 61.3 parts of water. After the reaction, the solution is brought to a pH of 7 by adding 0.4 part of formic acid.

A 4.5% strength aqueous solution has the following viscosity:

| | 20° | 50° | 80° |
|---|---|---|---|
| mPas | 170 | 250 | 1,950 |

An 0.3% strength aqueous solution of the product is used as a quenching bath for the hardening of steel. When hardening a K.8, 30 CrMo V 9 steel, the hardening curve obtained is the same as when hardening with quenching oil. At the same concentration, the product can also be used as a quenchant for inductive hardening.

EXAMPLE 16

225.6 parts of tris-(3-aminopropyl)-amine are introduced into a flask. 60 parts of urea are added at room temperature and the mixture is raised to 140° C. in the course of 45 minutes, during which vigorous evolution of ammonia occurs. After a reaction time of 60 minutes, the mixture is diluted with 200 parts of water and the solids content (52.3%) is determined. It is then diluted with 71.4 parts of water to an active ingredient content of 45% (acid number 0.47 milliequivalent/g; amine number 11.9 milliequivalents/g). 750 parts of a 15% strength aqueous solution of the polyether crosslinking agent of Example 1 are added to 50 parts of the 45% strength solution. The mixture is then heated. During the reaction time of three hours at 80° C., a further 66.5 parts of water containing 4 parts of concentrated sodium hydroxide solution are added. The mixture is then cooled, brought to pH 4 with 20 parts of formic acid and diluted to 12% content of active ingredient with a further 238 parts of water.

A 5% strength solution has the following viscosity:

| | 20° | 50° | 80° |
|---|---|---|---|
| mPas | 10 | 1,630 | 12,100 |

3% of the product may be added as a thickener to print pastes for textile printing. Strike-through of the colorant is thereby prevented, so that the prints have a substantially glossier appearance. An 0.4% strength solution of the product can be used as a quenchant for aluminum and aluminum alloys.

We claim:

1. A water-soluble, crosslinked nitrogen-containing condensation product, the viscosity of which, in aqueous solution, increases with increasing temperature, obtained by reacting a block copolymer of the formula:

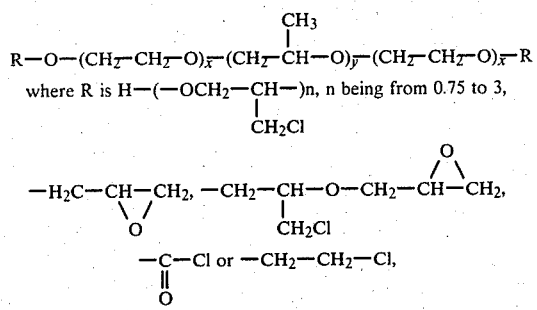

x is from 50 to 250, y is from 20 to 100, and the ratio of x to y is from 6.5:1 to 1:15, with at least one compound having at least four basic NH groups, selected from the group consisting of:

(1) polyalkylene polyamines of the formula

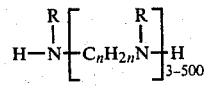

wherein R is H, alkyl of 1 to 4 carbon atoms, alkylsulfonate of 1 to 6 carbon atoms or $-CH_2-COOH$, and n is 2-4;

(2) condensation products of ammonia or an amine with ethylene chloride, ephichlorohydrin, or a short-chain dichlorohydrin ether, the viscosity of the condensation products being at most 2,500 m Pas, measured in 50% strength aqueous solution at 20° C., and (3) condensation products of a polyamine, having 3 to 10 basic nitrogen atoms per molecule, with a dicarboxylic acid of 4 to 10 carbon atoms, the viscosity of the condensation products being at most 2,500 m Pas, measured in 50% strength aqueous solution at 20° C., in a polar solvent at a temperature of from 20° to 180° C. in a weight ratio of from 0.8:1 to 30:1.

2. A water-soluble, crosslinked nitrogen-containing condensation product as claimed in claim 1, wherein the polyalkylene polyamine is polyethyleneimine.

3. A water-soluble, crosslinked nitrogen-containing condensation product as claimed in claim 1, wherein the compound having at least four basic NH groups is a polyamidoamine obtained by condensation of dicarboxylic acids with polyamines having 3 to 10 basic nitrogen atoms, the viscosity of the polyamidoamine in 50% by weight aqueous solution being from 40 to 1,800 mPas measured in 50% aqueous solution at 20° C.

4. A water-soluble, crosslinked nitrogen-containing condensation product as set forth in claim 1, wherein the condensation products of ammonia or amine with ethylene chloride, epichlorohydrin, or a short-chain dichlorohydrin ether have at least 4 carbon atoms, the viscosity of said condensation products being from 30 to 1,700 mPas, measured in 50% aqueous solution at 20° C.

* * * * *